(12) United States Patent
Baker et al.

(10) Patent No.: US 7,339,790 B2
(45) Date of Patent: Mar. 4, 2008

(54) HALOGEN LAMPS WITH MAINS-TO-LOW VOLTAGE DRIVERS

(75) Inventors: Karl Baker, Dundee, NY (US); Jack Baldrige, Hammondsport, NY (US); Oliver Boehme, Aachen (DE); Marlena Brzozowski, Stolberg (DE); Utsawa Chaturvedi, Rochester, NY (US); Winand Friederichs, Elsloo (NL); Rebecca Ketchum, Hammondsport, NY (US); Mark Morrell, Bath, NY (US); Bruno Thoennessen, Simmerath (DE); Vineet Tyagi, Corning, NY (US); Eswara Vallabhaneni, Elmira, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 23 days.

(21) Appl. No.: 11/204,880

(22) Filed: Aug. 16, 2005

(65) Prior Publication Data

US 2006/0038497 A1    Feb. 23, 2006

Related U.S. Application Data

(60) Provisional application No. 60/602,582, filed on Aug. 18, 2004.

(51) Int. Cl.
*H05K 7/20* (2006.01)

(52) U.S. Cl. .......... 361/709; 361/704; 315/57; 315/58; 362/257

(58) Field of Classification Search .......... 315/56, 315/58, 205, 291, 294, 276, 363, 254, 255; 362/255, 257, 21; 361/704, 709, 707, 679, 361/688, 600
See application file for complete search history.

(56) References Cited

U.S. PATENT DOCUMENTS

| 4,998,044 | A | * | 3/1991 | Nilssen | 315/200 R |
|---|---|---|---|---|---|
| 5,465,025 | A | * | 11/1995 | Hendrickson | 313/318.09 |
| 6,144,568 | A | * | 11/2000 | Franck et al. | 363/39 |
| 6,147,457 | A | * | 11/2000 | Lohn et al. | 315/209 R |
| 6,433,493 | B1 | * | 8/2002 | Ilyes et al. | 315/291 |
| 6,814,470 | B2 | * | 11/2004 | Rizkin et al. | 362/327 |
| 6,992,446 | B2 | * | 1/2006 | Hashimoto et al. | 313/635 |
| 2004/0080393 | A1 | * | 4/2004 | Phadke | 336/206 |

* cited by examiner

*Primary Examiner*—Douglas W. Owens
*Assistant Examiner*—Ephrem Alemu

(57) ABSTRACT

A halogen lamp includes a mains base and a converter operably connected to the mains base. The converter has a lamp socket, a toroid transformer, and a heat sink disposed within a center opening of the toroid transformer. A lamp is removably disposed in the lamp socket. The converter has a power density between 0.75 and 3.75 Watts/cm3. In an alternate embodiment, the halogen lamp includes a low voltage, low pressure IRC lamp operably connected to the converter.

22 Claims, 10 Drawing Sheets

HALOGEN LAMPS WITH MAINS-TO-LOW VOLTAGE DRIVERS

CROSS REFERENCE TO RELATED APPLICATION

This application claims the benefit of U.S. provisional application Ser. No. 60/602,582, filed Aug. 18, 2004, which is incorporated herein by reference.

This invention relates generally to lamps, and more specifically to halogen lamps with mains-to-low voltage drivers.

Halogen lamps, such as MR-16 lamps, have become increasingly popular. Compared to conventional lamps of the same wattage, halogen lamps provide a higher quality light with a high efficacy, have a longer life, and are more rugged. Such lamps operate at a low voltage of 12 to 24 Volts, or a high frequency of 10 to 60 kHz, rather than the commonly available mains voltage of 120 to 230 Volts at a frequency of 50 to 60 Hz. For the halogen lamp to operate at low voltage, a converter is required to change the mains voltage to low voltage. Examples of converters include electronic converters and induction transformers.

Unfortunately, technical problems with converters have limited use of the low voltage lamps to special applications. Converters generate heat, limiting either the physical size or the electrical output in existing devices. If the electrical output is high, the physical size must be large to dissipate the heat. If the physical size is small to fit standard lighting fixtures, the electrical output is low. One approach to the heat dissipation problem is to use a separate, centralized standard induction or electronic transformer as the converter. This approach limits how the lamp can be used and prevents use with mains voltage sockets. Attempts have been made to fit converters within fixture volumes of about 40 cm$^3$, but existing devices are limited to an output of 20 to 30 Watts. This corresponds to a power density of about 0.5 to 0.75 W/cm$^3$. Thus, the physical size or the electrical output in existing devices is limited.

Low voltage integrated halogen lamps which are commercially available have a number of limitations. The currently available halogen lamps are one-piece, high pressure lamps having low efficacy. Lamps with integrated converters are limited to an output of less than 30 Watts by the power density of the converter. The lamps have a converter volume of about 40 cm$^3$, which results in a converter power density of less than 0.75 W/cm$^3$. The inability to transfer heat from the converter and resulting degradation of converter components prohibits higher power densities. Commercially available halogen lamps also use high pressure fill gas at 0.2 to 1.0 MPa. General lighting incandescent products have lower pressures, typically below 0.2 MPa. Reducing halogen lamp pressure to the general lighting incandescent lamp pressure reduces halogen lamp life and degrades lumen maintenance over life.

In addition, currently available halogen lamps waste valuable components which can be reused, and limit functional and aesthetic options. Because the halogen lamps are one-piece, the still functioning converter and base are discarded when the bulb fails, or the still functioning bulb is discarded when the converter or base fails. This wastes valuable resources and is environmentally unfriendly. The functional and aesthetic options of the one-piece design are also fixed: the lamp is limited to providing light and cannot be adapted to provide additional functions and to fit into different decor.

It would be desirable to have a low voltage halogen lamp that overcomes the above disadvantages.

One aspect of the present invention provides a low voltage halogen lamp including a mains base; a converter operably connected to the mains base, the converter having a lamp socket; and a lamp removably disposed in the lamp socket; wherein the converter has a power density between 0.75 and 3.75 Watts/cm$^3$.

Another aspect of the present invention provides a system for driving a low voltage lamp including means for connecting to the mains power and means for converting the mains power to low voltage power operably connected to the connecting means, wherein the converting means has a power density between 0.75 and 3.75 Watts/cm$^3$.

Another aspect of the present invention provides a low voltage halogen lamp including a mains base, a converter operably connected to the mains base, and a low voltage, low pressure IRC lamp operably connected to the converter.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

Figure 1:
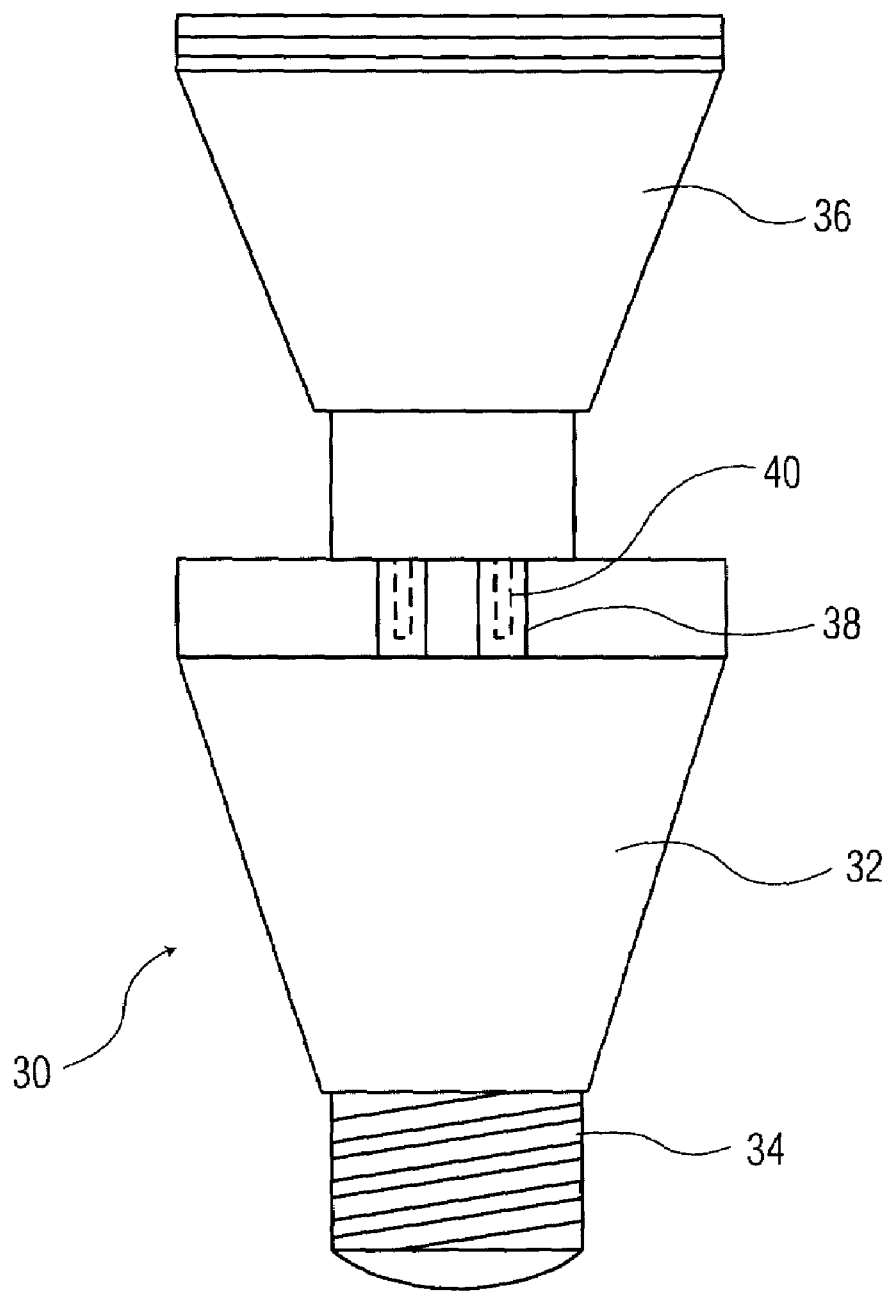
FIG. 1 is a side view of a halogen lamp made in accordance with the present invention.

FIG. 1 is a side view of a halogen lamp made in accordance with the present invention. The halogen lamp 28 includes a mains-to-low voltage driver 30 and a lamp 36. The mains-to-low voltage driver 30 includes a converter 32 and a mains base 34. The mains-to-low voltage driver 30 receives mains voltage through the mains base 34 and provides low voltage to the lamp 36 through the connection of lamp socket 38 of the converter 32 with lamp connector 40 of the lamp 36. In this example, the halogen lamp 28 is non-integrated, i.e., the lamp 36 is detachable from the mains-to-low voltage driver 30. The mains-to-low voltage driver 30 fits within the outline of a standard A-line shape incandescent lamp. The mains-to-low voltage driver 30 has a diameter of less than about 41 mm. and is typically about 32 mm. The mains-to-low voltage driver 30 has a length of about 40 to 67 mm. and is typically about 40 mm.

The mains base 34 can be any lamp base normally used to connect a lamp to mains voltage. In the example illustrated, the mains base 34 is an E-type base, such as an E26-type, or an E27-type. In an alternative embodiment, the mains base 34 is a bayonet-type base, such as a B22-type, or any other mains voltage base.

The converter 32 receives high voltage power from the mains base 34 and converts it to low voltage power. Depending on the location in the world, the mains voltage is typically about 100 to 240 Volts at 50 to 60 Hz. The low voltage for a typical halogen lamp is 12 to 24 Volts. The converter 32 is designed to dissipate heat, enabling it to deliver more than 30 Watts of power to the lamp 36. The converter 32 typically provides 50 to 75 Watts, although higher powers, such as 150 Watts, are possible. For an exemplary cylindrical converter 32 having a diameter of 32 mm. and a length of 50 mm., which has a volume of 40 cm$^3$, the power density is 0.75 Watts/cm$^3$ for a 30 Watt lamp and 3.75 Watts/cm$^3$ for a 150 Watt lamp. The shell of the converter 32 can be made of plastic, ceramic, or any suitable material. In one embodiment, the converter 32 is made of a heat dissipative ceramic to dissipate heat from and act as a fireproof containment about the circuit components of the converter 32. In one embodiment, potting of the circuit components in a thermally conductive material increases heat transfer from the circuit components through the heat dissipative ceramic shell.

The converter 32 includes a lamp socket 38 complementary to the lamp connector 40 of the lamp 36. In the example shown, the lamp connector 40 is a two-pin GU5.3 base. The lamp 36 powered by the converter 32 can be any low voltage halogen lamp, such as the exemplary MR-16 lamp illustrated, or a low voltage, low pressure IRC lamp. In this example, the lamp 36 is a two-pin halogen low voltage lamp, such as the 50 W lamp Product Number 046677-39262-1 or the 75 W lamp Product Number 046677-37808-3, both available from Koninklijke Philips Electronics N.V.

Figure 2:
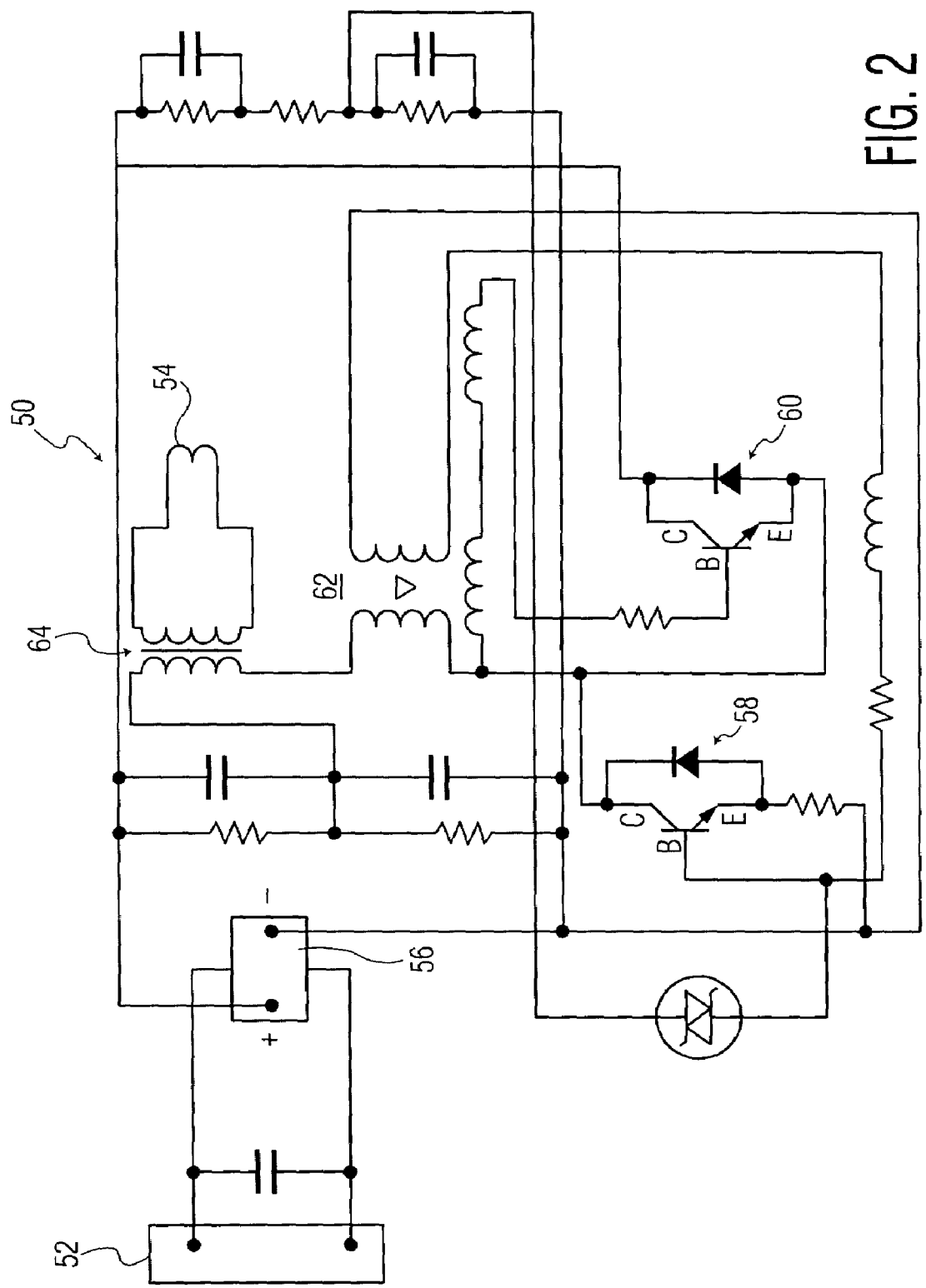
FIG. 2 is a schematic diagram of a circuit for a converter for a halogen lamp made in accordance with the present invention.

FIG. 2 is a schematic diagram of a circuit for a converter for a halogen lamp made in accordance with the present invention. The circuit 50 receives mains power 52 as high voltage power, such as 120V, 60 Hz, and delivers low voltage power, such as 12 to 24V at 10 to 60 kHz, to the lamp 54. The mains power 52 is converted to DC power by the AC/DC converter 56. The power transistors 58, 60 alternately conduct in response to switching control signals from the small toroid transformer 62. The power transistors 58, 60 switch current flow through the big toroid transformer 64, providing high frequency chopped current to the lamp 54. The power transistors 58, 60 are attached to a heat sink (not shown) to remove heat. The chopping frequency is controlled by the ratio of the number of turns in small toroid transformer 62, while the big toroid transformer 64 converts the chopped waveform to appropriate low voltage suitable for the particular lamp 54, such as an MR-16.

Figure 3A:
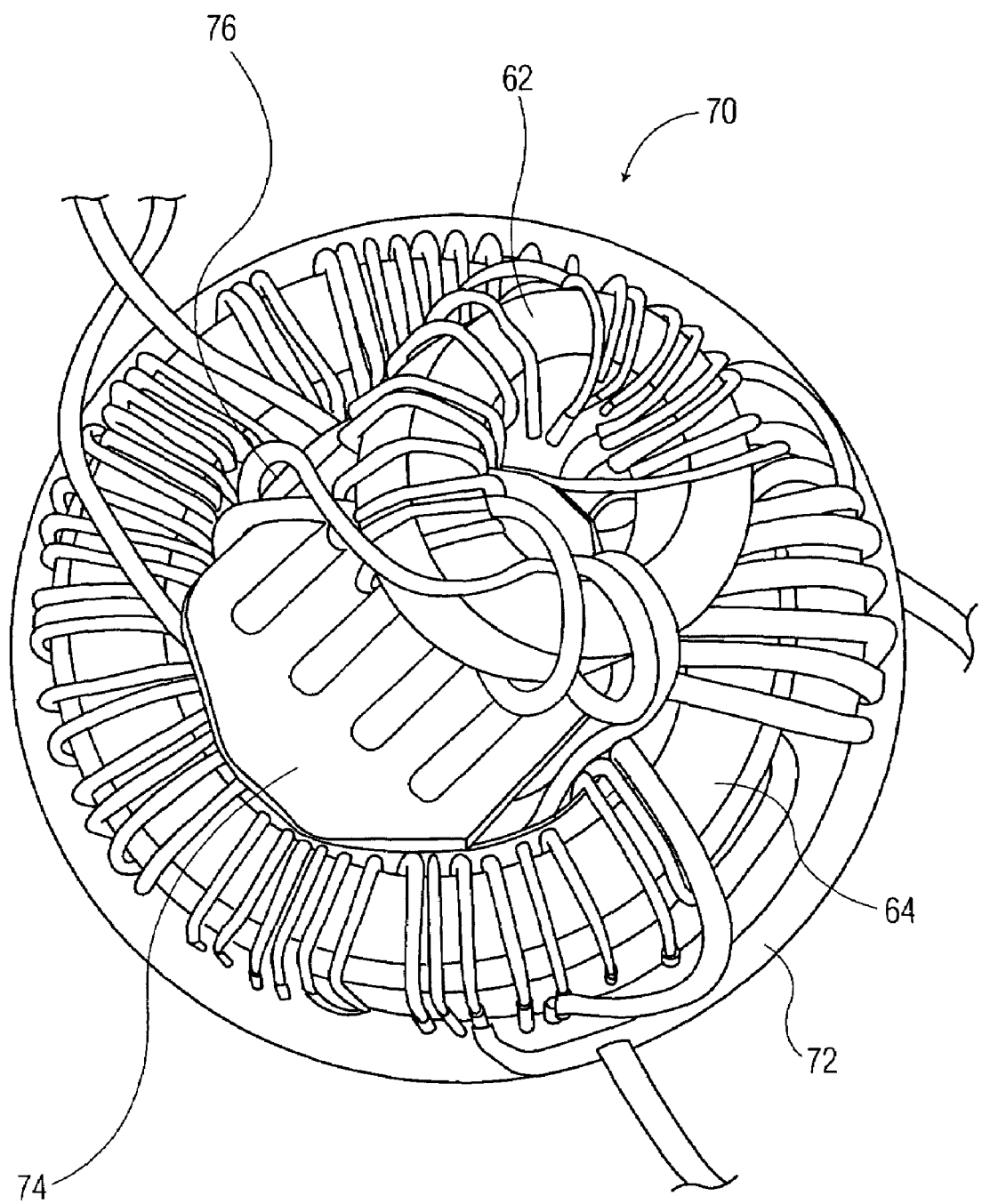
FIGS. 3A & 3B are top and side views, respectively, of the circuitry for a converter for a halogen lamp made in accordance with the present invention.
Figure 3B:
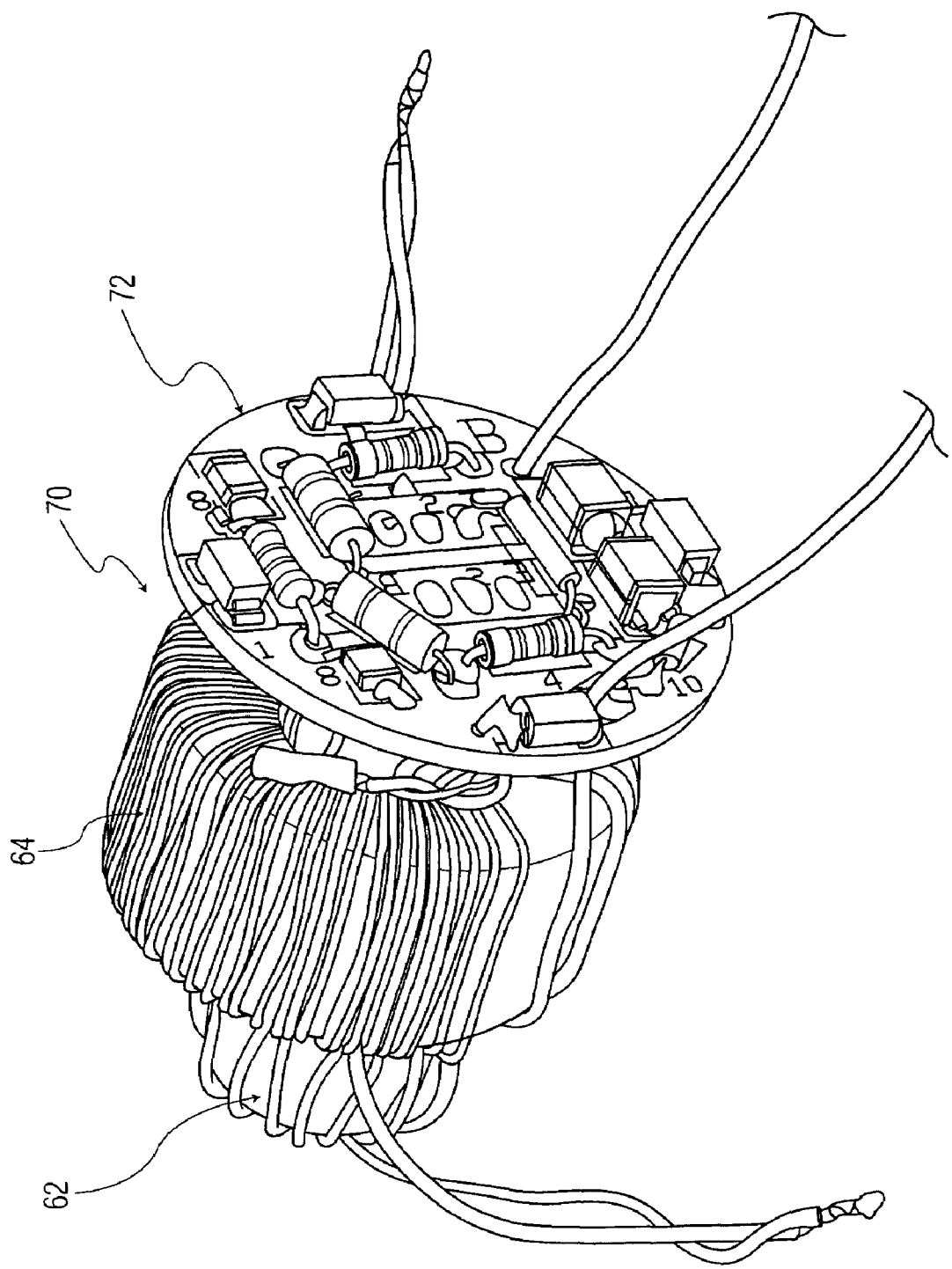

FIGS. 3A & 3B are top and side views, respectively, of the circuitry for a converter for a halogen lamp made in accordance with the present invention. Like elements of FIGS. 2, 3A, & 3B share like reference numbers. The components of the converter circuitry 70 are arranged to maintain the compact size of the converter and to manage heat transfer from the higher temperature components.

The big toroid transformer 64 is mounted adjacent to and has about the same diameter as the circuit board 72. The big toroid transformer 64 is mounted coaxially with the central axis of the converter. In one embodiment, the big toroid transformer 64 includes a toroidal ferrite core having an inner diameter of 16 mm, an outer diameter of 26 mm, and a height of 15 mm, and has a power density of 12 W/cm$^3$. The power transistors (not shown) are mounted on a heat sink 74 made of a highly conductive material, such as copper or aluminum. In one embodiment, the power transistors are mounted to the heat sink 74 with a conductive adhesive and are electrically isolated. The heat sink 74 is located within a center opening 76 of the big toroid transformer 64. The small toroid transformer 62 is mounted adjacent to the heat sink 74 and is magnetically isolated from the big toroid transformer 64.

The circuit components are disposed on both sides of a circuit board 72. Typically, the circuit components generating the most heat, such as the big toroid transformer 64, the small toroid transformer 62, and the power transistors with heat sink 74, are on the side of the circuit board 72 away from the lamp and nearer the mains base. The other circuit components are on the side of the circuit board 72 nearer the lamp. In one embodiment, both sides of the power supply circuitry 70 are potted with a thermally conductive material, such as thermally conductive and electrically insulating epoxy, to transfer heat from the power supply circuitry. In an alternative embodiment, only one side of the power supply circuitry, such as the side with the most heat generating circuit components, is potted with the conductive material. In one embodiment, the potted components are contained within a heat dissipative ceramic shell.

Figure 4:
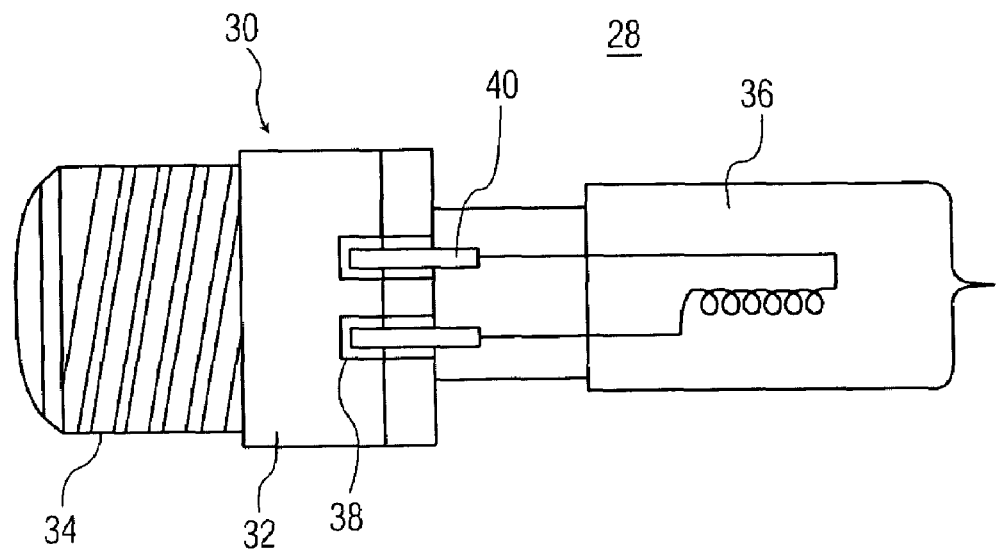
FIG. 4 is a schematic diagram of another embodiment of a halogen lamp made in accordance with the present invention.

FIG. 4 is a schematic diagram of another embodiment of a halogen lamp made in accordance with the present invention. The halogen lamp 28 includes a mains-to-low voltage driver 30 and a lamp 36. The mains-to-low voltage driver 30 includes a converter 32 and a mains base 34. The mains-to-low voltage driver 30 receives mains voltage through the mains base 34 and provides low voltage to the lamp 36 through the connection of lamp socket 38 of the converter 32 with lamp connector 40 of the lamp 36. The lamp 36 powered by the converter 32 can be any low voltage halogen lamp. In this example, the lamp 36 is a two-pin halogen low voltage capsule lamp, such as the 50 W lamp Product Number 046677-23265-2 or the 75 W lamp Product Number 046677-13441-1, both available from Koninklijke Philips Electronics N.V. In an alternate embodiment, the lamp 36 is a two-pin halogen low voltage, low pressure capsule lamp, or a low voltage, low pressure IRC lamp. The halogen lamp 28 is non-integrated, i.e., the lamp 36 is detachable from the mains-to-low voltage driver 30. The design of the mains-to-low voltage driver 30 allows different wattage lamps at a given low voltage to be used with a single mains-to-low voltage driver. Those skilled in the art will appreciate that the mains-to-low voltage driver circuit can be selected to provide low voltage in the 12 to 24 Volt range as discussed.

Figure 5:
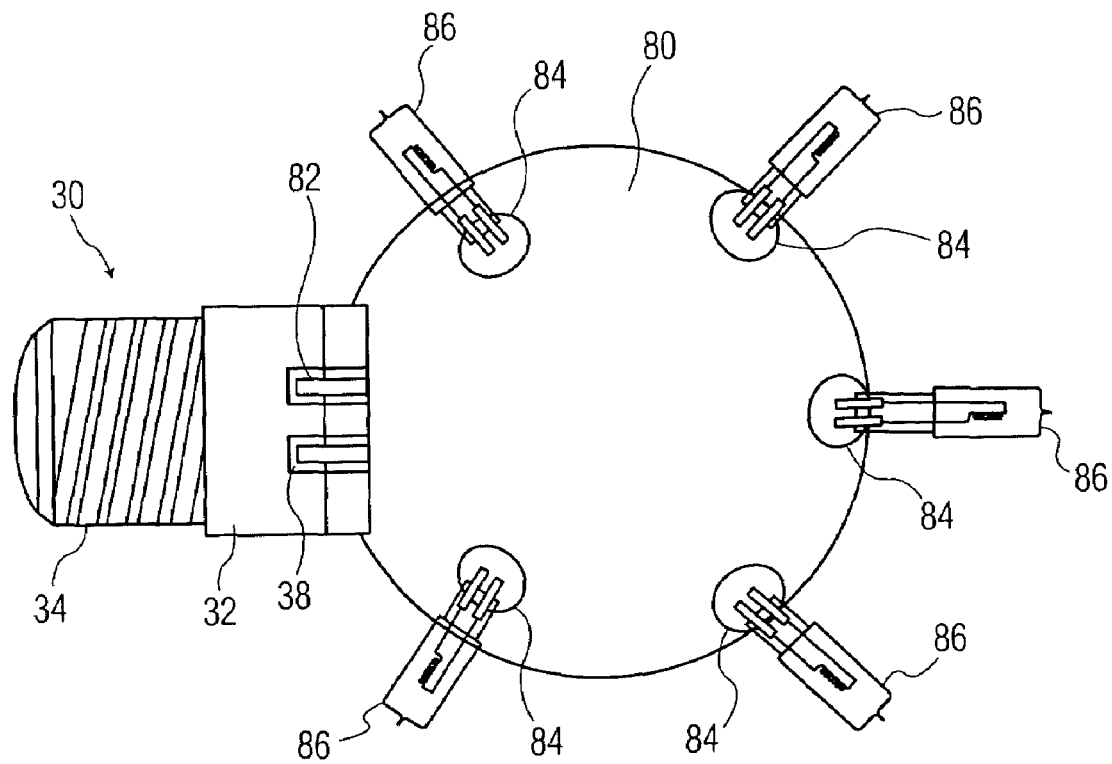
FIG. 5 is a schematic diagram of a halogen lamp having a functional module made in accordance with the present invention.

FIG. 5 is a schematic diagram of a halogen lamp having a functional module made in accordance with the present invention. The functional module 80 includes one or more functional devices to extend operation of the mains-to-low voltage driver 30. In the example shown, the functional device is a multi-lamp adapter.

The mains-to-low voltage driver 30 includes the mains base 34 and the converter 32. The converter 32 has a lamp socket 38 adapted to receive the functional module connector 82 of the functional module 80. In the multi-lamp adapter example shown, the functional module 80 includes lamp sockets 84 to receive a number of lamps 86. The multi-lamp adapter can have any shape desired for functional or aesthetic purposes.

Those skilled in the art will appreciate that the functional module 80 can include functional devices singly or in combination. Other functional devices include those controlling lamp operation, such as a remote control switch, a level control switch, a photo-sensor, or a motion sensor. The functional devices can also add electrically powered features, such as a smoke alarm or an illuminated mirror. The functional module 80 allows a single mains-to-low voltage driver 30 to be tailored to perform a number of functions.

Figure 6A:
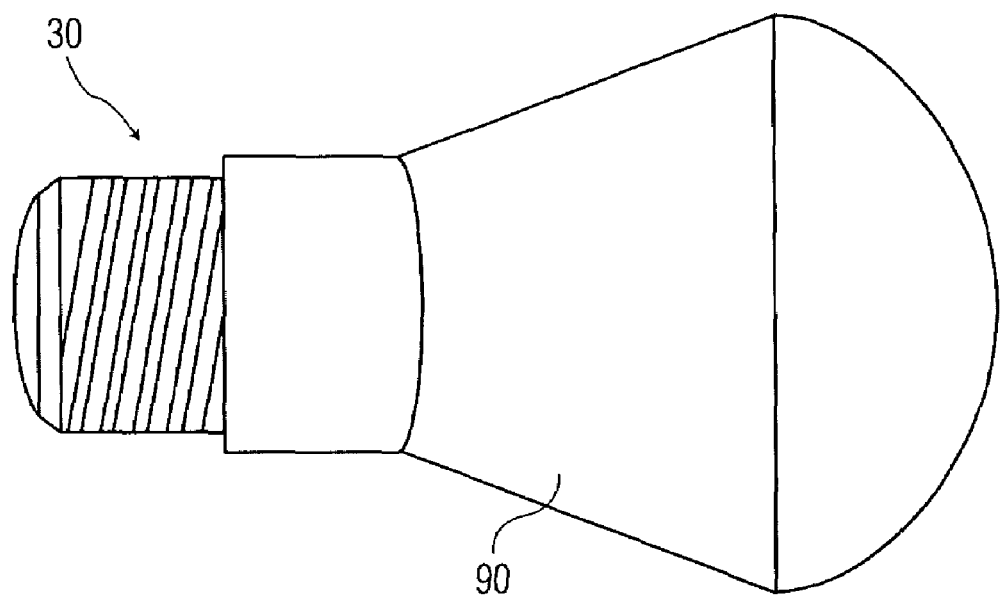
FIGS. 6A & 6B are schematic diagrams of a halogen lamp having an interchangeable globe made in accordance with the present invention.
Figure 6B:
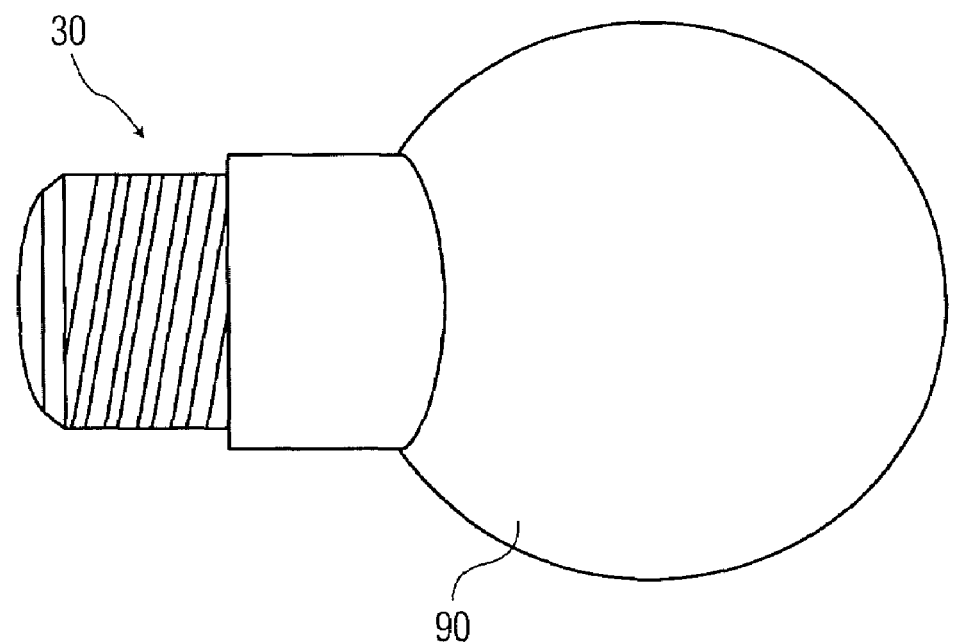

FIGS. 6A & 6B are schematic diagrams of a halogen lamp having an interchangeable globe made in accordance with the present invention. The mains-to-low voltage driver 30 and the interchangeable globe 90 are provided with complementary fittings, such as threaded or bayonet fittings, to removably connect the mains-to-low voltage driver 30 and the interchangeable globe 90. The interchangeable globe 90 can have any shape, finish, or color desired for functional or aesthetic purposes.

Figure 7:
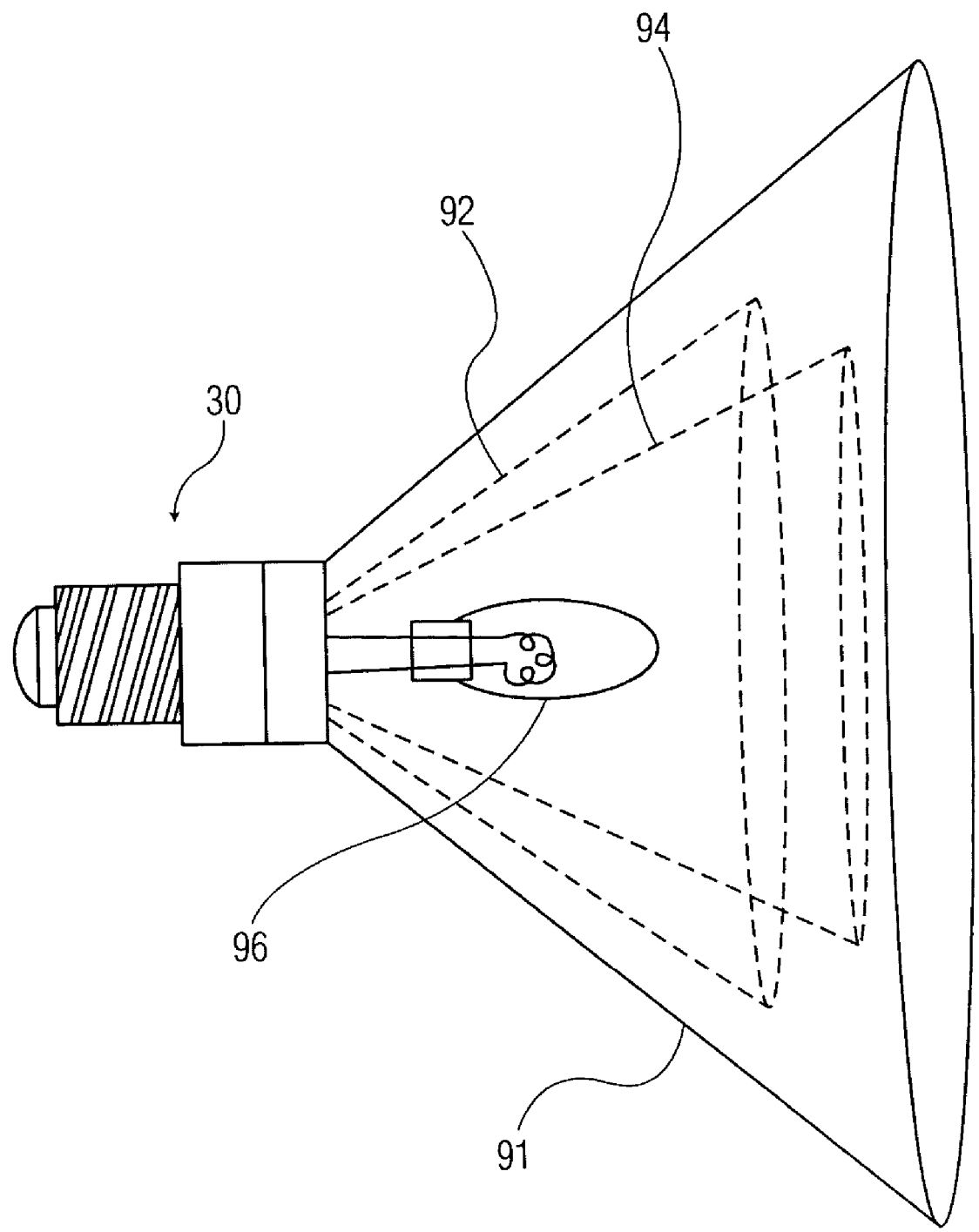
FIG. 7 is a schematic diagram of a halogen lamp having an interchangeable reflectors made in accordance with the present invention.

FIG. 7 is a schematic diagram of a halogen lamp having an interchangeable reflector made in accordance with the present invention. The mains-to-low voltage driver 30 and the interchangeable reflector 91 are provided with complementary fittings, such as threaded or bayonet fittings, to removably connect the mains-to-low voltage driver 30 and the interchangeable reflector 91. The interchangeable reflector 91 can have any shape, finish, or color desired for functional or aesthetic purposes. The interchangeable reflector 91 shown in the example is a PAR38 reflector used with a low voltage capsule lamp 96. Other examples of interchangeable reflectors, shown with dotted lines for clarity, include the PAR20 reflector 92 and the PAR16 reflector 94. Those skilled in the art will appreciate that any reflector can be adapted to fit the mains-to-low voltage driver 30 and selected as the interchangeable reflector 91.

Figure 8A:
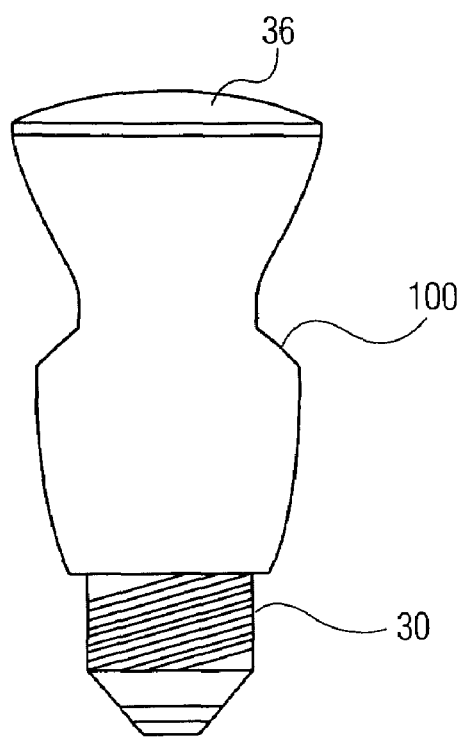
FIGS. 8A & 8B are schematic diagrams of a halogen lamp having an interchangeable cover made in accordance with the present invention.
Figure 8B:
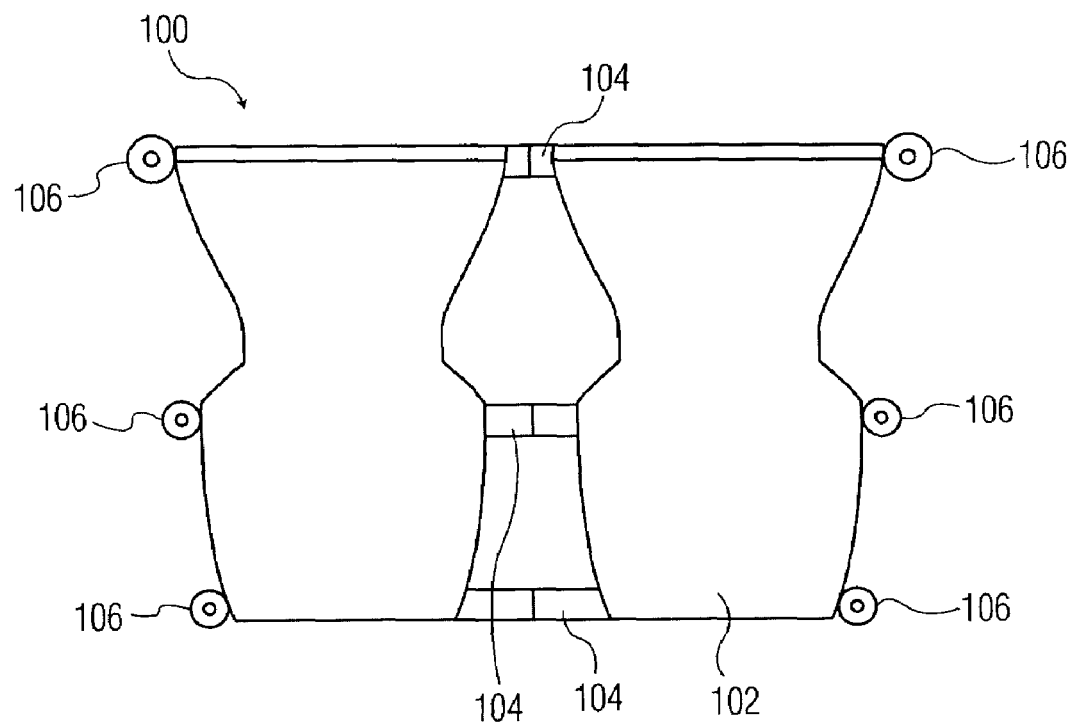

FIGS. 8A & 8B are schematic diagrams of a halogen lamp having an interchangeable cover made in accordance with the present invention. FIG. 8A shows the interchangeable cover installed on the halogen lamp and FIG. 8B shows the interchangeable cover alone. The interchangeable cover 100 is disposed about the halogen lamp, which includes the mains-to-low voltage driver 30 and the lamp 36, such as MR-16 or MR-11 lamp. The interchangeable cover 100 can have any pattern, color, shape, or finish desired for functional or aesthetic purposes.

In one embodiment as shown in FIG. 8B, the interchangeable cover 100 includes two half covers 102 joined by hinges 104 and having catches 106. The interchangeable cover 100 can be injection molded of plastic as a single piece. The interchangeable cover 100 is installed about the mains-to-low voltage driver 30 and the lamp 36 by folding the two half covers 102 at the hinges 104 and securing the catches 106. In an alternative embodiment, the interchangeable cover 100 is an expandable sleeve, which slides over the mains-to-low voltage driver 30 and the lamp 36.

Figure 9A:
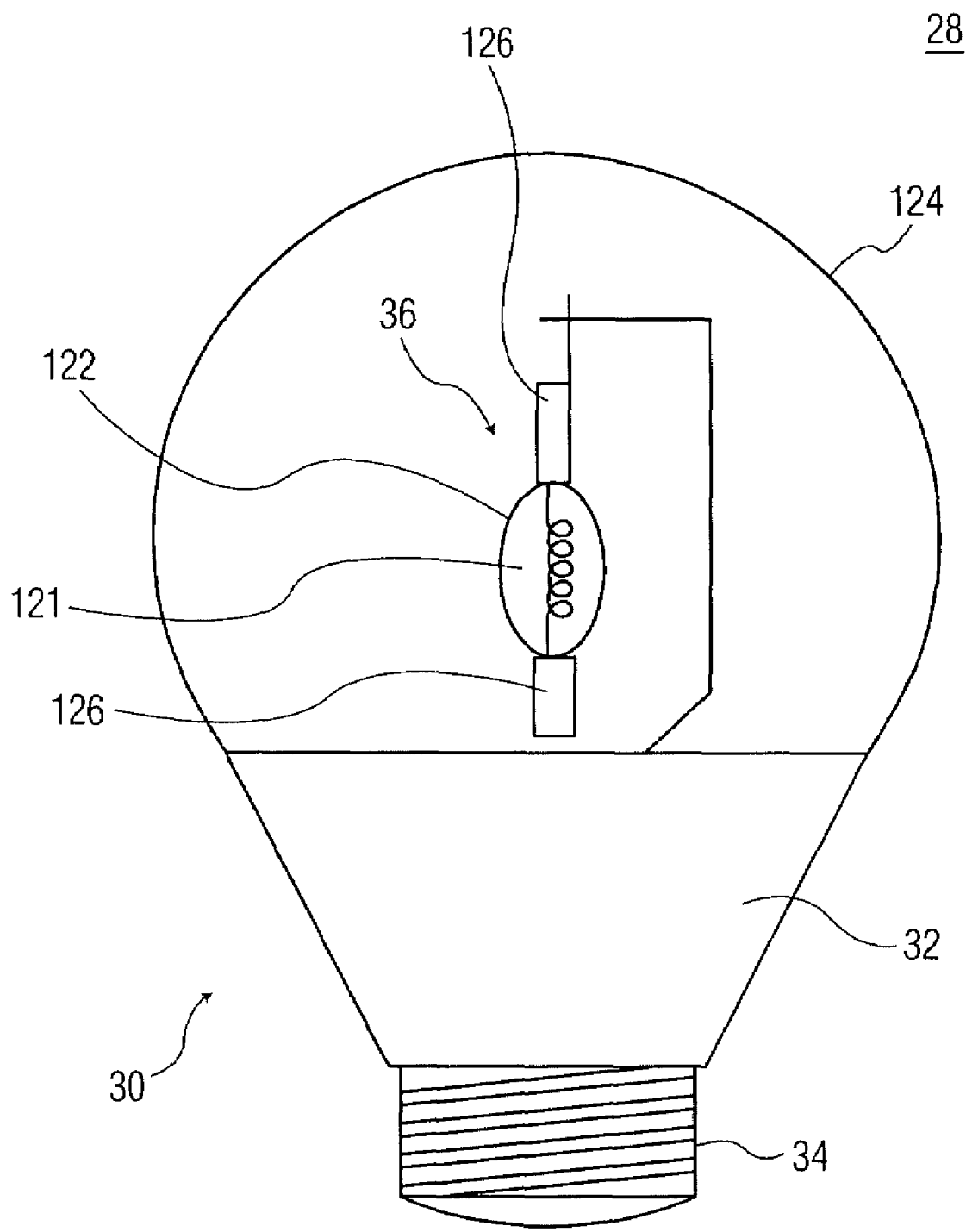
FIGS. 9A & 9B are schematic diagrams of another embodiment of a halogen lamp made in accordance with the present invention.
Figure 9B:
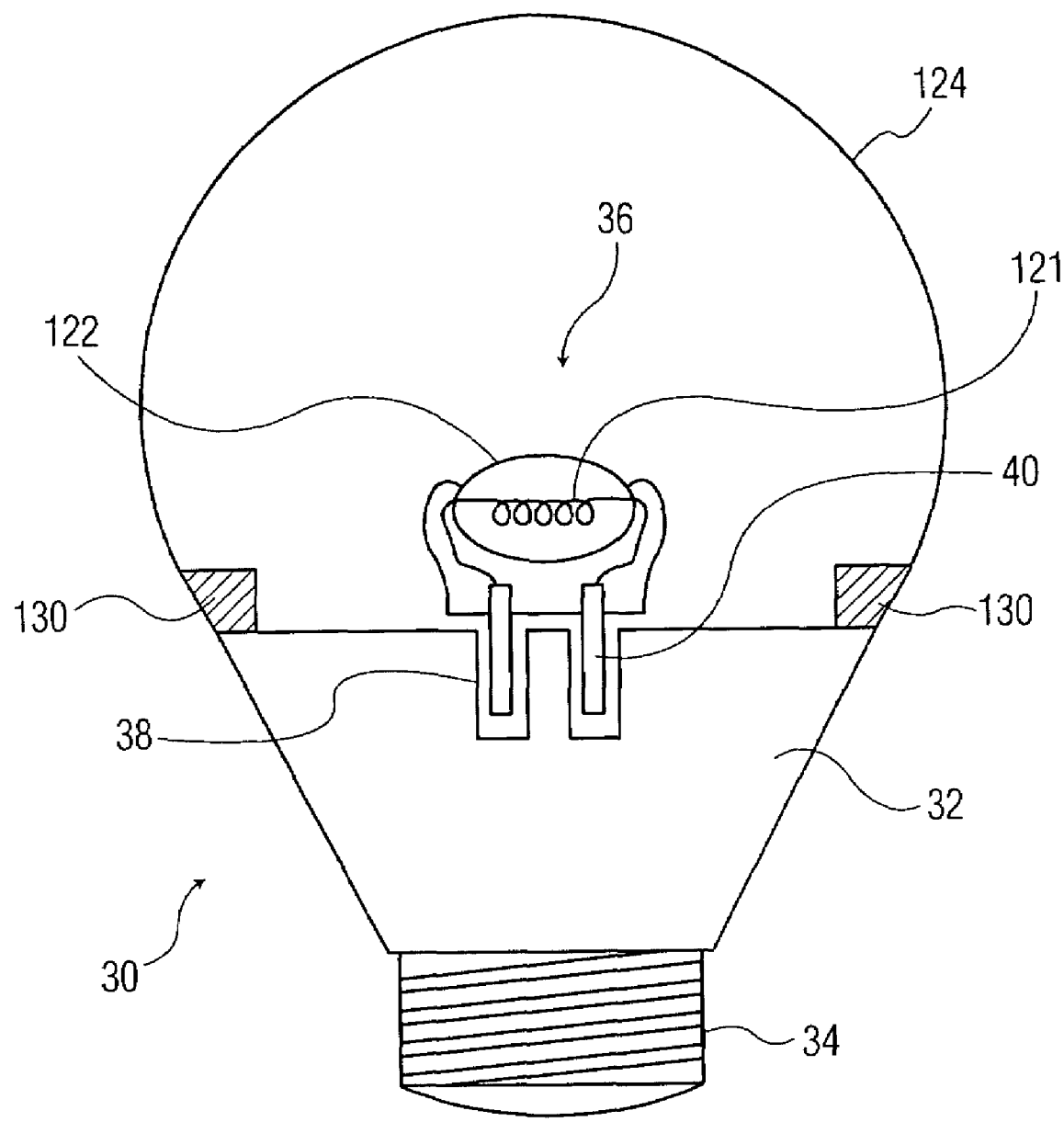

FIGS. 9A & 9B are schematic diagrams of another embodiment of a halogen lamp made in accordance with the present invention. FIG. 9A shows the mains-to-low voltage driver integral to the halogen lamp. FIG. 9B shows a halogen lamp having a removable envelope and replaceable low voltage, low pressure IRC lamp.

The halogen lamp 28 includes a mains-to-low voltage driver 30 and a lamp 36. The mains-to-low voltage driver 30 includes the mains base 34 and the converter 32. The low voltage, low pressure infrared coating (IRC) lamp 36 includes a filament 121 enclosed in a capsule 122, which contains low pressure halogen gas. The filament 121 is electrically connected to the output of the converter 32 to receive low voltage power, such as 12 to 24 Volts at 10 to 60 kHz. The capsule 122 can be made of glass and is provided with an infrared coating (IRC) to reflect infrared light from the filament 121 back to the filament 121. Reflecting the infrared light to the filament 121 increases filament temperature, increasing the efficacy of the lamp 36. The shape of the capsule 122 is typically selected to focus the reflected infrared light on the filament 121. The low pressure halogen gas within the capsule 122 is at a low pressure less than 0.2 MPa, and is typically 0.1 MPa.

The example of FIG. 9A provides an integral low voltage halogen lamp 28 using the low voltage, low pressure IRC lamp 36. In this example, the halogen lamp 28 is integrated, i.e., the lamp 36 is attached to the mains-to-low voltage driver 30. The capsule 122 is enclosed in an envelope 124 fixedly attached to the mains-to-low voltage driver 30. The lamp 36 includes contacts 126 on either end of the elliptical capsule 122. The envelope 124 can be made of glass, plastic, or any suitable material desired to meet functional or aesthetic requirements.

The example of FIG. 9B provides a low voltage halogen lamp 28 using the low voltage, low pressure IRC lamp 36. In this example, the halogen lamp 28 is non-integrated, i.e., the lamp 36 is detachable from the mains-to-low voltage driver 30. An envelope 124 is removably disposed about the capsule 122, and removably attached to the mains-to-low voltage driver 30 at envelope connection 130 by a threaded fitting, bayonet fitting, or the like. The envelope 124 can be made of glass, plastic, or any suitable material desired to meet functional or aesthetic requirements. The converter 32 includes a lamp socket 38 complementary to the lamp connector 40 of the lamp 36, so that the lamp 36 is removable and replaceable. In the example shown, the connection between the lamp 36 and the converter 32 is a two-pin connector. In alternate embodiments, the connection is a threaded connector, a bayonet connector, or the like.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

The invention claimed is:

1. A halogen lamp comprising:
    a mains base;
    a converter operably connected to the mains base, the converter having a lamp socket, a toroid transformer, and a heat sink disposed within a center opening of the toroid transformer; and
    a lamp removably disposed in the lamp socket;
    wherein the converter has a converter power density between 0.75 and 3.75 Watts/cm$^3$.

2. The halogen lamp of claim 1, wherein the converter power density is between 1.25 and 1.88 Watts/cm$^3$.

3. The halogen lamp of claim 1, wherein a diameter of the converter is less than 37 mm.

4. The halogen lamp of claim 1, wherein the toroid transformer is mounted transverse to and along a central axis of the converter.

5. The halogen lamp of claim 1, wherein the converter further comprises a power transistor for switching current through the toroid transformer, the power transistor being mounted on the heat sink.

6. The halogen lamp of claim 1, wherein the toroid transformer is potted in a thermally conductive and electrically insulating material.

7. The halogen lamp of claim 6, further comprising a heat dissipative ceramic shell disposed about the toroid transformer.

8. The halogen lamp of claim 1, wherein the mains base is selected from the group consisting of an E-type base, an E26-type base, an E27-type base, a bayonet-type base, and a B22-type base.

9. The halogen lamp of claim 1, further comprising a functional module connectable to the lamp socket, the functional module having a functional device selected from the group consisting of a remote control switch, a level control switch, a photo-sensor, a motion sensor, a smoke alarm, an illuminated mirror, and a multi-lamp adapter.

10. The halogen lamp of claim 1, further comprising an interchangeable globe.

11. The halogen lamp of claim 1, further comprising an interchangeable reflector.

12. The halogen lamp of claim 1, further comprising an interchangeable cover disposed about the converter and the lamp.

13. The halogen lamp of claim 1, wherein the lamp is selected from the group consisting of a low voltage halogen lamp and a low voltage, low pressure infrared coating lamp.

14. A system for driving a low voltage lamp comprising:
means for connecting to the mains power; and
means for converting the mains power to low voltage power operably connected to the connecting means, said means for converting including a toroid transformer and a heat sink disposed within a center opening of the toroid transformer;
wherein the converting means has a power density between 0.75 and 3.75 Watts/cm$^3$.

15. The system of claim 14, further comprising means for transferring heat from the converting means.

16. A halogen lamp comprising:
a mains base;
a converter operably connected to the mains base and having a toroid transformer and a heat sink disposed within a center opening of the toroid transformer; and
a low voltage, low pressure infrared coating IRC lamp operably connected to the converter.

17. The halogen lamp of claim 16, further comprising an envelope disposed about the low voltage, low pressure IRC lamp.

18. The halogen lamp of claim 16, wherein gas pressure within the low voltage, low pressure IRC lamp is less than 0.2 MPa.

19. The halogen lamp of claim 16, wherein the low voltage, low pressure IRC lamp is operably connected to the converter by a connector selected from the group consisting of a two-pin connector, a threaded connector, and a bayonet connector.

20. The halogen lamp of claim 16, wherein the converter has a power density between 0.75 and 3.75 Watts/cm$^3$.

21. The halogen lamp of claim 16, further comprising an envelope removably disposed about the low voltage, low pressure IRC lamp.

22. The halogen lamp of claim 1, further comprising a circuit board for mounting circuit elements, wherein the toroid transformer is mounted on a side of the circuit board further away from the lamp and nearer to the mains base.

* * * * *